(12) United States Patent
Roth

(10) Patent No.: US 6,730,765 B1
(45) Date of Patent: May 4, 2004

(54) RELEASE LAYER AND METHOD OF PREPARATION

(75) Inventor: Joseph D. Roth, Springboro, OH (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 10/325,344

(22) Filed: Dec. 19, 2002

(51) Int. Cl.⁷ .............................. C08G 77/442
(52) U.S. Cl. .................... 528/25; 528/26; 528/32; 528/38; 528/24; 525/100
(58) Field of Search .................. 528/24, 26, 32, 528/38; 525/100

(56) References Cited

U.S. PATENT DOCUMENTS

| | | | |
|---|---|---|---|
| 5,527,578 A | | 6/1996 | Mazurek et al. |
| 5,728,501 A | * | 3/1998 | Nakanishi et al. ..... 430/108.22 |
| 6,277,445 B1 | * | 8/2001 | Hasegawa et al. ......... 427/387 |
| 6,387,590 B1 | * | 5/2002 | Mizutani et al. ......... 430/270.1 |

FOREIGN PATENT DOCUMENTS

| JP | 57172964 A | * 10/1982 | ............ C09D/3/82 |
|---|---|---|---|

OTHER PUBLICATIONS

Abstract of WO 2001/096443.*
Hall et al., "Spontaneous Polymerization Can Occur During Cycloaddition Reactions of Olefins and Dienes," *Aldrichimica Acta*, vol. 28, No. 2, 1995, pp. 37–44.
Oestreich et al., "Radiation–Curable Silicone Acrylates–Synthesis and Application," *Silicones in Coatings III*, Mar. 28–30, 2000, Paper 6, pp. 1–10.
RadTech 2000, *Technical Proceedings*, 2000, pp. 191–194.
Kerr et al., "Next Generation" UV–Silicone Release Coatings, pp. 1–26, published on or before Mar. 13, 2001.

* cited by examiner

*Primary Examiner*—Robert Dawson
*Assistant Examiner*—Marc S. Zimmer
(74) *Attorney, Agent, or Firm*—Millen, White, Zelano & Branigan PC

(57) ABSTRACT

A release layer on a substrate, substrates comprising said release layer, coating formulations which provide the release layer and methods for preparing the release layer to render surfaces non-adherent. The release layer comprises copolymers of an electron donor molecule and a maleamic-functional silicone having at least one maleamic acid group. The cure of the coating formulation is not inhibited by oxygen or basic materials.

22 Claims, No Drawings

RELEASE LAYER AND METHOD OF PREPARATION

FIELD OF THE INVENTION

This invention relates to organosiloxane oligomers and curable compositions containing them. The organosiloxane oligomers contain maleamic acid functionality. Blends of these organosiloxane oligomers, electron poor vinyl compounds, and free radical photoinitiators are curable or crosslinkable upon exposure to ultraviolet light or radiation. The resulting cross-linked films are particularly useful in silicone based release coating applications.

BACKGROUND

Silicone compositions have long been used to make release liners for pressure sensitive tapes and labels, wall coverings, and other tacky substances. Silicone release coatings are commonly available in four families: solvent based silicone release coatings, 100% solids silicone release coatings, water-based silicone release coatings and UV/EB curable silicone release coatings.

Solvent-based silicones consist of dispersions of reactive high molecular weight polysiloxane gums in organic solvents. A crosslinking catalyst is added to the dispersed low-solids mixture just prior to coating. The mixture is then applied to the substrate as a very thin layer. Common coating methods include direct or reverse gravure, Mayer rod, size press, roll coating and the like. The web is then passed through an oven. The heat from the oven removes the solvent and accelerates the cross-linking or curing reaction. This process requires a large amount of thermal energy to evaporate the solvent and drive the curing reaction at commercially viable rates. Environmental regulations require that solvent vapors cannot escape into the atmosphere. The solvent vapors must either be trapped or incinerated. This requires considerable capital and operating expenditure. Rising energy costs and stringent environmental regulations are causing this once dominant technology to be replaced with more environmentally friendly alternatives.

Water-based silicones or emulsion silicones consist of dispersions of reactive silicone polymers in water. A cross-linking catalyst is added to the emulsion just prior to coating. The mixture is then applied to the substrate as a very thin layer. Common coating methods include direct or reverse gravure, Mayer rod, size press, roll coating and the like. The web is then passed through an oven. The heat from the oven removes the water and accelerates the cross-linking or curing reaction. Water-based silicones do avoid the environmental regulations associated with solvent systems. However, evaporating the water and driving the curing reaction at commercially viable rates is capital and energy intensive.

100% solids thermally cured silicones consist of a mixture of low molecular weight silicone polymers, a cross-linker and a catalyst. Optionally, a cross-linking reaction inhibitor is added to the mixture to extend the bath life. Once these components are combined, the cross-linking reaction begins. The mixture is applied to the substrate before the cross-linking reaction increases the viscosity of the bath to unusable levels. After coating, the substrate is heated to accelerate the cross-linking reaction. Common coating methods include direct or reverse gravure, Mayer rod, size press, roll coating and the like. 100% solids, thermally cured silicones typically have no solvent associated environmental limitations. However, driving the curing reaction at commercially viable rates is capital and energy intensive.

Another class of 100% solids release layer compositions is UV or EB (electron beam) curable. As with all 100% solids systems, solvent associated limitations typically are not present. UV curable compositions are applied to the substrate using the common coating methods mentioned previously. Two curing mechanisms are prominent in the UV cured silicone release liner market. One is a free radical polymerization; the other is a cationic mechanism.

Free radical photoinitiators generate free radicals on exposure to UV light. The free radicals initiate a chain reaction or polymerization of acrylate functional groups. This polymerization nearly instantly transforms the liquid coating to a solid release layer. Commonly available free radical photoinitiators are insoluble or very slightly soluble in polydimethylsiloxane (PDMS) fluids. Functionalized PDMS fluids are a major component in all silicone release compositions. Low solubility causes problems when selecting photoinitiators for this application. A further difficulty is that the free radical cure mechanism is inhibited by oxygen. These systems typically require nitrogen purge at the point of UV exposure. Providing an inert atmosphere at the point of cure adds expense and complexity to the coating and curing process. Another feature of the free radical system is the lack of a cold or dark cure. The free radical polymerization proceeds while the substrate is exposed to UV light. Once the light is removed, the reaction stops.

Cationic photoinitiators generate acids on exposure to UV light or an electron beam (EB). The acid initiates a chain reaction or polymerization of epoxy (oxirane) functional groups. This polymerization transforms the liquid coating to a solid release layer. This reaction is much slower than the free radical polymerization. Commonly available cationic photoinitiators are insoluble or very slightly soluble in the epoxy-functionalized PDMS fluids that are the base-polymers for this type of coating. Photoinitiators were developed specifically for cationic silicone release compositions. A full discussion of cationic photoinitiators and epoxy-silicones is set forth in U.S. Pat. Nos. 4,279,717 and 5,814,679 both of which are incorporated by reference. Cationic silicones are very sensitive to the pH of the substrate. Even slightly basic substrates will greatly impede or even quench the cure. Substrates used for other thermally cured silicones or free radically cured silicones typically will not work with cationic silicones. Cationic silicones require special acidic substrates.

The following references relate to the field of the invention: U.S. Pat. Nos. 5,527,578; 6,008,267; J. Ericsson, M, Nilsson, S. Lundmark, L. Svensson, S. Jonsson, K. Lindgren, "Radtech 2000 Conference Proceedings", 2000, pages 173–195; H. K. Hall, A. B. Padias, Aldrichimica Acta, Vol. 28, No 2, 1995, Pages 37–44.

SUMMARY OF THE INVENTION

The present invention describes 100% solids UV cured chemistry useful in creating release layers. As with the release layers described above, the release properties are provided by the PDMS portion of the release layer. Charge-transfer complexes can provide the curing or reactive portion of the release compositions.

A charge-transfer (Ci) complex, which is also called an electron-donor-acceptor (EDA) complex, is formed when two olefins of differing polarities are mixed. The individual olefins are referred to as the electron donor and the electron acceptor. A CT complex is in equilibrium with the parent olefins. The paper by Hall and Padias in Aldrichimica Acta, Vol. 28 No. 2, 1995 describes such CT complexes. The reactivity of a CT complex depends on the electron density donated from the electron donor to the electron acceptor. The greater the electron donation, the greater the reactivity. In the case of large electron density donation, spontaneous polymerization will take place. This is undesirable for the present invention. This invention describes olefin functional groups that do not spontaneously polymerize at room temperature.

CT complexes are more reactive via a free radical mechanism than either of the uncomplexed olefins. A great advantage of free radical reactions with CT complexes is that inhibition by oxygen is greatly reduced or even eliminated. Such a system overcomes the two major disadvantages or deficiencies of the cationic and free radical systems commercially available. Neither oxygen, nor basic materials inhibit the polymerization of CT. Thus the present invention provides UV cured silicone release formulations that do not suffer the major limitations of UV cured free radical systems or the major limitation of UV cured cationic systems.

The present invention also provides coating formulations of olefins that when combined; establish equilibrium with a CT complex. The strength of the CT complex is such that spontaneous polymerization does not make the coating formulation uncoatable for a reasonable period of time. Acceptable bath-life for thermal silicones is 4 or more hours. The coating formulations disclosed herein typically have bath-lives measured in weeks or months.

Also provided by this invention is a method useful for rendering surfaces non-adherent to materials that normally adhere to them. This method makes use of UV cured charge transfer complexes within mixtures of maleamic functional silicones and electron donating molecules.

A method of preparing maleamic functionalized silicones is described. These maleamic functionalized silicones can be used as the electron density acceptor olefins in a charge transfer complex. Suitable electron donating molecules (olefins) that form useful charge transfer complexes with maleamic functionalized silicones are also described. Additionally, photoinitiators suitable for initiating the polymerization of silicone release compositions containing maleamic functionalized silicones and electron donating olefins are described.

These and other embodiments of the present invention will become apparent to those skilled in the art upon examination of the detailed description, examples and claims of this invention.

The maleamic-functional silicones used in this invention are prepared by reacting amine-functional silicones with maleic anhydride. The process will be described hereinafter in detail. The resulting maleamic-functionalized silicones are combined with one or more electron donor molecules. Typical electron donor molecules include vinyl ethers, propenyl ethers, styrene ethers and N-vinylpyrrolidone. A charge transfer complex can form from the electron donor molecules and the maleamic-functional silicones. Equilibrium between the electron donor molecules, the maleamic-functional silicones and the charge transfer complex is established. The charge transfer complex is much more reactive towards free radical polymerization than either the electron donor molecules or the maleamic-functional silicones. The charge transfer will be described hereinafter in detail. Next, one or more photoinitiators is dissolved in the mixture to form a coating formulation of this invention. The electron donor molecules, typically olefin monomers, greatly increase the solubility of common photoinitiators in the maleamic-functional silicones. This is a significant advantage of these coating formulations and the silicone release layers obtained there from. Photoinitiators incompatible with free radical and cationic systems are often soluble in these silicone release formulations and coatings.

The coating formulations of this invention can be applied to a substrate and cured by exposure to UV light. The coating formulations can be applied to suitable substrates by any coating means, for example, by brushing, dipping, spraying, or by coating techniques such as offset gravure, transfer roll coating or Meyer rod. The UV initiated reaction cures the silicone containing coating formulation to a release layer on the substrate. Suitable substrates can be any surface requiring a release layer. Typically paper, plastic films, tapes, textiles, sheets, fibers, glass, ceramic objects, wood, metals or any shaped objects can be a suitable substrate. Preferred substrates include papers (SCK, OCR bond and glassine are examples), films (polypropylene, polyethylene and polyesters are common examples) and metal foils. Exposing the coating formulations to UV light causes a rapid polymerization. The mixture hardens to a tack-free, smear-free layer in less than 1 minute. In the preferred embodiments the polymerization requires less than 1 second. The release layers are typically cured by UV, but are not limited to curing via UV. Other curing methods are also acceptable such as, for example, electron beam curing.

Suitable electron donor molecules are olefins such as the vinyl ethers described in U.S. Pat. Nos. 5,889,084 and 4,950,696. The electron donor molecules can also be chosen from the olefin monomers of formula (II)

$$R_{10}CH=CHA \qquad (II)$$

wherein

A is a nucleophilic moiety, preferably selected from the group consisting of pyrrolidone, $—OR_2$, -phenyl-$OR_2$, or

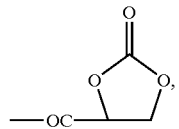

$R_2$ is straight or branched $C_1$–$C_{20}$ alkyl, wherein optionally one or more non-adjacent $—CH_2—$ groups are replaced with O and/or cyclohexyl, and which is optionally terminated with OH or $—OCH=CHR_1$, and $R_{10}$ is H or methyl.

The monomers of formula II can comprise, for example, vinyl ethers, styrene ethers and propenyl ethers comprising, for example, hexanediol divinyl ether, 2-ethylhexyl vinyl ether, dodecyl vinyl ether, cyclohexanedimethanol divinyl ether, cyclohexanedimethanol monovinyl ether, cyclohexyl vinyl ether, poly-THF-divinyl ether, triethylene glycol divinyl ether, diethylene glycol divinyl ether, propenyl ether of propylene carbonate, hydroxybutyl vinyl ether, ethyl vinyl ether, n-butyl vinyl ether, isobutyl vinyl ether, octadecyl vinyl ether, butanediol divinyl ether, hydroxybutyl vinyl ether, diethyleneglycol divinyl ether, triethyleneglycol divinyl ether, n-propyl vinyl ether and isopropyl vinyl ether. The monomer of formula II may also comprise, for example, n-vinylpyrrolidone.

The above-described electron donating olefins can be used as the only electron donating olefin in the finished mixture. Mixtures of two or more electron donating olefins can also be used. It is often desirable to use mixtures of electron donating olefins to affect the final properties of the release surface. It is also often desirable to use a mixture of electron donating olefins to enhance the miscibility and solubility of the components.

The maleamic-functional silicones used in this invention as electron accepting olefins, can be polymers, random copolymers, block copolymers or multiblock copolymers containing repeating units selected from the group consisting of A, B and C below.

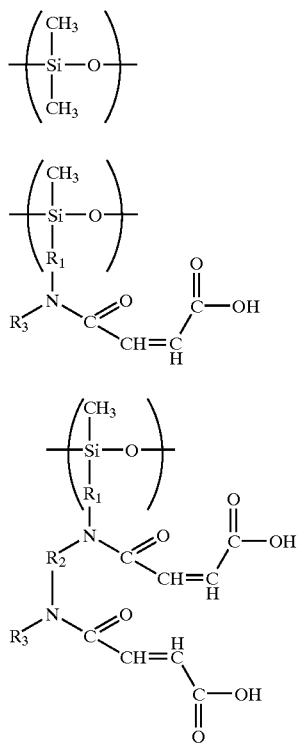

In each case $R_1$ and $R_2$ are independently $C_1$–$C_{20}$ linear or branched alkenyls and $R_3$ is H or a $C_{1\text{-}10}$ linear or branched alkyl. The maleamic-functional silicones can be terminated by one or more of the groups shown below:

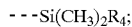

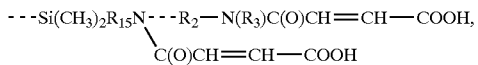

In each case:

$R_{15}$ and $R_2$ are independently $C_1$–$C_{20}$ linear or branched alkenyls, or $C_3$–$C_{20}$ cyclic alkenyls;

$R_4$ is $C_1$–$C_{20}$ linear or branched alkyls or $C_3$–$C_{20}$ cyclic alkyls;

$R_3$ is H or a $C_1$ to $C_{10}$ linear or branched alkyl or $C_3$–$C_{20}$ cyclic alkyl. Each polymer must contain at least one maleamic acid functional group of formula A shown below.

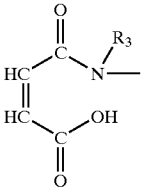

Each polymer may contain more than one maleamic acid functional group such as, for example, one or more of the above maleamic acid functional groups per repeating unit.

The maleamic-functional silicones can be prepared by the reaction of amine-functional silicones with maleic anhydride. Many aminofunctional silicone fluids can be used to prepare the maleamic-functional silicones. Aminofunctional silicones are commonly used in many industries. They are frequently used in the modification of polymers, internal mold release agents, release agents and components in coatings for textiles and polishes. As such, many aminofunctional silicones are available for use in this invention.

Examples of suitable aminofunctional silicones include polydimethylsiloxane with 3-{(2-aminoethyl)aminopropyl}methyl, (Rhodia) aminopropyl-Methylsoloxane-dimethylsiloxane copolymers (Gelest Inc.), aminoethylaminopropylMethylsiloxane-dimethylsiloxane copolymers (Gelest Inc.), aminoethylaminoisobutyl-Methylsiloxane-dimethylsiloxane copolymers (Gelest Inc.), aminoethylaminopropylmethylsiloxane-dimethylsiloxane copolymer (GE Bayer Silicones), polydimethylsiloxane, aminopropyl terminated (Gelest inc.).

The reaction between the aminofunctional silicone fluid and the maleic anhydride conveniently does not require a solvent. The aminofunctional silicone fluid and maleic anhydride are simply mixed together. The reaction proceeds slowly at room temperature as depicted in the following fashion:

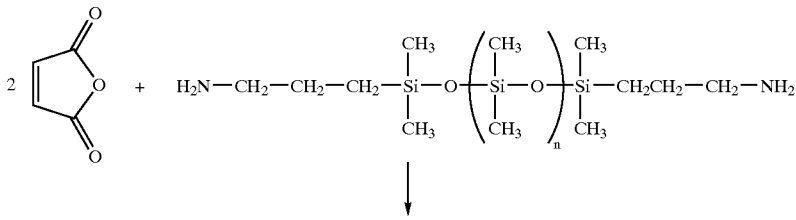

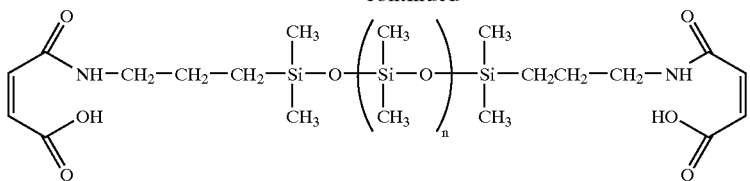

Heating the mixture above the melting point of maleic anhydride (52.8° C.), significantly increases the rate of reaction. Ideally, exactly one mole of maleic anhydride is provided for every mole amine. It is practical to add a slight excess of maleic anhydride to the mixture. The excess maleic anhydride can be removed after the reaction is completed. The preferred method is to heat the mixture to 100° C. and vacuum strip the maleic anhydride. This method has the side benefit of removing low molecular weight silicone impurities from the mixture. The low molecular weight silicones are vacuum stripped with the maleic anhydride. Mixtures of low molecular weight silicones, without amine functionality, are common impurities in aminofunctional silicone fluids. Removing the low molecular weight silicones from the final product is very desirable. Release layers must be free of low molecular weight silicones as they can migrate to the adhesive and destroy the adhesive properties. The product of this reaction is a liquid, paste or solid depending on the degree of functionality and the starting molecular weight of the aminofunctional silicone. Note that removal of the excess maleic anhydride is not required. Maleic anhydride can be an electron acceptor in a charge transfer complex.

When the electron acceptors are combined with the electron donors, an equilibrium is formed between the monomers and the CT complex.

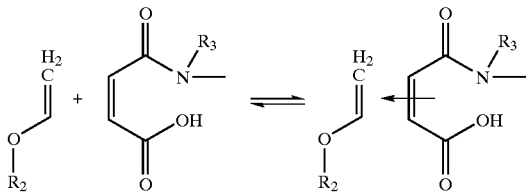

In the embodiments described herein, a color change is associated with the formation of the CT complex. Shortly after mixing the clear solution changes to a yellowish red color. Color changes are associated with CT complex formation as described by the paper by Hall and Padias in Aldrichimica Acta, Vol. 28 No. 2, 1995.

A photoinitiator is required for these mixtures to polymerize at commercially useful rates. Many compounds sold as free radical photoinitiators are suitable. Suitable photoinitiators include but are not limited to: 1-hydroxycyclohexyl phenyl ketone (HCPK), 2-benzyl-2-N,N-dimethylamino-1-(4-morpholinophenyl)-1-butanone (DBMP), benzophenone, 2,2-dimethoxy-2-phenyl acetophenone (BDK), 2-methyl-1-[4-(methylthio)phenyl]-2-morpholino propan-1-one (MMMP), 2-hydroxy-2-methyl-1-phenyl-propan-1-one (HMPP), bis (2,6-dimethoxybenzoyl)-2,4-,4-trimethylpentyl phosphine oxide (DMBAPO), 4-(2-hydroxyethoxy)phenyl-(2-hydroxy-2-methylpropyl)ketone, 2,4,6-trimethylbenzoyl-diphenylphosphine oxide (TPO), isobutyl benzoin either, 2-benzyl-2-dimethylamino-1-(4-morpholinophenyl)-butan-1-one (BDMB), 2,2-dimethoxyacetophenone (DEAP), [4-(4-methylphenylthio)phenyl]phenylmethanone 4-benzoyl-4'-methyldiphenyl sulfide (BMDS), ethyl-4-(dimethylamino)benzoate (EDB), 2-isopropyl thioxanthone (ITX), 4-isopropyl thioxanthone (ITX), camphorquinone, 4-methyl benzophenone and 4,4'-bisdimethylamino benzophenone (Michler's ketone). A single photoinitiator can be used or a combination of photointiators can be used to polymerize the coating.

In addition, common coinitiators and photosensitizers can be added to the mixture to enhance the rate of polymerization. Coinitiators are molecules that take part in a bimolecular initiating system. For example amines, especially tertiary amines, are coinitiators for benzophenone. A photosensitiser is a type of coinitiator. A photosensitiser absorbs energy and then transfers it to another molecule, usually the photoinitiator. Photosensitisers are often added to shift the light absorption characteristics of a system.

It is possible, although not preferred, to use polymerization inhibitors to increase the pot life of the mixture. Polymerization inhibitors scavenge free radicals that can form during storage. This prevents the polymerization from proceeding until the polymerization inhibitor is consumed. Polymerization inhibitors are typically added in minute quantities (typically at the ppm level). Note that the polymerization inhibitor must be consumed before free radical polymerization can take place. To initiate polymerization enough photoinitiator must be added to consume the polymerization inhibitor and initiate the polymerization. Two common polymerization inhibitors are hydroquinone (HQ) and hydroquinone monomethyl ether (MEHQ or 4-methoxyphenol).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above or below, is hereby incorporated by reference.

EXAMPLE #1

78.1 g of the silicone amine DMS-A15 (Geleste) was placed in a 125 Erlenmeyer flask with 5.1 g of maleic anhydride (Aldrich). A magnetic stir bar was added to the mixture. A rubber septa was placed on the flask. The flask was then purged with nitrogen gas. The mixture was heated with stirring to 100° C. The heat was turned off and the mixture was allowed to cool to room temperature with stirring. The resulting viscous clear liquid was used to make the UV curable release formulations described below.

The MA-PDMS was mixed with hexanediol divinyl ether (HDDVE) and a photoinitiator to form silicone coatings as described in Table 1. The mixtures were initially clear and slowly changed to a yellow color within 24 hrs.

TABLE 1

Cure results for MA-PDMS/HDDVE blends.

| | Weight Percent | | | Mole Percent | | | | |
|---|---|---|---|---|---|---|---|---|
| ID | MA-PDMS | HD-DVE | Daro 1173 | MA-PDMS | HD-DVE | Daro 1173 | Ratio VE/MA | Comments |
| 1-1 | 90.2 | 6.2 | 3.6 | 35.5 | 37.5 | 27.0 | 1.1 | Very smeary/still liquid on the paper. |
| 1-2 | 76.4 | 20.0 | 3.6 | 16.9 | 68.2 | 14.9 | 4.0 | Smear-free release layer. Released 3M 3750 tape. |
| 1-3 | 66.4 | 29.9 | 3.7 | 11.1 | 77.2 | 11.6 | 6.9 | Smear-free release layer. Released 3M 3750 tape. |
| 1-4 | 56.2 | 40.1 | 3.7 | 7.6 | 83.1 | 9.3 | 11.0 | Smear-free release layer. Released 3M 3750 tape. |
| 1-5 | 46.1 | 50.2 | 3.7 | 5.2 | 86.9 | 7.9 | 16.8 | Slight smear. |

MA-PDMS—Maleamic acid functionalized polydimethyl siloxane.
HD-DVE—Hexanediol divinyl ether.
Daro 1173—Darocure 1173 from Ciba Gigy. Free radical photoinitiator.

The mixtures described in Table 1 were spread onto UV 350 type supercalendered release base paper (Wausau-Mosinee Paper Corporation) using a #6 Meyer rod. The coating was passed under a 300 W/in medium pressure mercury bulb at 25 fpm. (UV Process Supply Inc.)

Examples 1-2, 1-3 and 1-4 are preferred as they created the best performing release layers.

EXAMPLE #2

74.8% (Wt/Wt) MA-PDMS described in example #1 was combined with 21.9% TEG-DVE and a 3.3% Darocure 1173 to form a release coating. This mixture was spread onto UV 350 type supercalendered release base paper (Wausau-Mosinee Paper Corporation) using a #6 Meyer rod. The coating was passed under a 300 W/in medium pressure mercury bulb at 25 fpm. (UV Process Supply Inc.) The resulting cured film was a smear free release layer. It released 3M 3750 tape well. 20

EXAMPLE #3

97.8 g of DMS-A12 (Geleste) and 20.1 g of maleic anhydride were placed in a 125 ml Erlenmeyer flask. The flask was fitted with a rubber septa and purged with nitrogen. The flask was heated to 100° C. with stirring. The mixture was allowed to cool to room temperature with stirring. The resulting slightly yellow liquid was very viscous at room temperature.

20.77 g of the MA-PDMS described above was mixed with 10.01 g of TEGDVE. The resulting solution was 67.5% (w/w) MA-PDMS and 32.5% TEGDVE. The ratio of VE to MA functionality was 2.5. To this mixture was added various free radical photoinitiators as described in Table 2. The mixtures containing photoinitiator were spread onto UV 350 type supercalendered release base paper (Wausau-Mosinee Paper Corporation) using a #6 Meyer rod. The coating was passed under a 300 W/in medium pressure mercury bulb at 25 fpm. (UV Process Supply Inc.) The results are summarized in Table 2.

TABLE 2

Photoinitiator concentrations and results for example #3.

| | Weight Percent | | | |
|---|---|---|---|---|
| ID | Irgacure 184 | Darocure 1173 | Irgacure 819 | Comments |
| 3-1 | 3.81 | 0 | 0 | Smear-free release layer. Released 3M 3750 tape well. |
| 3-2 | 3.02 | 0 | 0 | Smear-free release layer. Released 3M 3750 tape well. |
| 3-3 | 2.10 | 0 | 0 | Slightly smeary release layer. Released 3M 3750 tape well. |
| 3-4 | 0.98 | 0 | 0 | Very smeary layer. Insufficient cure to form a release layer. |
| 3-5 | 1.94 | 0 | 0.19 | Smear-free release layer. Released 3M 3750 tape well. |
| 3-6 | 0.97 | 0 | 0.23 | Very smeary layer. Insufficient cure to form a release layer. |
| 3-7 | 0 | 1.95 | 0 | Slightly smeary release layer. Released 3M 3750 tape well. |
| 3-8 | 0 | 1.99 | 0.24 | Smear-free release layer. Released 3M 3750 tape well. |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A release layer on a substrate comprising copolymers of a maleamic-functional silicone having at least one maleamic acid group of the formula A

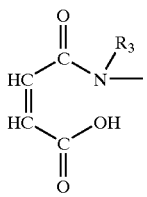

and an electron donor molecule selected from the group consisting of vinyl ethers, propenyl ethers, styrene ethers and N-vinylpyrrolidone.

2. A release layer as in claim 1 wherein the maleamic-functional silicone having at least one maleamic acid group is a polymer, random copolymer, block copolymer or multi-block copolymer containing a) one or more repeating units A, B and C as follows:

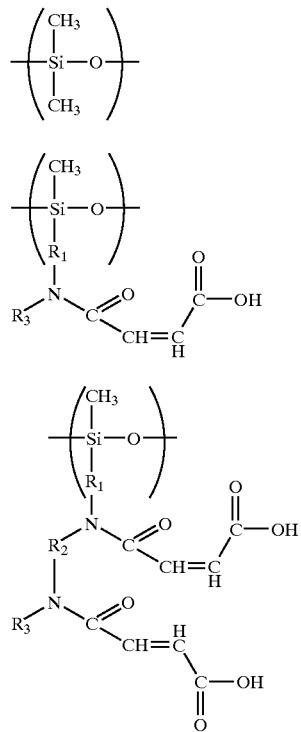

wherein in each case $R_1$ and $R_2$ are independently $C_1-C_{20}$ linear or branched alkenyls and $R_3$ is H or a $C_{1-10}$ linear or branched alkyl and b) one or more terminal groups as follows:

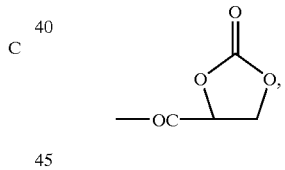

wherein $R_{15}$ and $R_2$ are independently $C_1-C_{20}$ linear or branched alkenyls, or $C_3-C_{20}$ cyclic alkenyls;

$R_4$ is $C_1-C_{20}$ linear or branched alkyls or $C_3-C_{20}$ cyclic alkyls; and $R_3$ is H or a $C_1$ to $C_{10}$ linear or branched alkyl or $C_3-C_{20}$ cyclic alkyl.

3. A release layer according to claim 2, wherein the electron donor molecule is an olefin monomer of formula (II)

$$R_{10}CH=CHA \qquad (II)$$

wherein A is a nucleophilic moiety, selected from the group consisting of pyrrolidone, $-OR_2$, -phenyl-$OR_2$, or

[structure]

wherein $R_2$ is straight or branched $C_1-C_{20}$ alkyl, optionally terminated with OH or $-OCH=CHR_1$, and one or more non-adjacent $-CH_2-$ groups are optionally replaced with O and/or cyclohexyl, and $R_{10}$ is H or methyl.

4. A release layer according to claim 1, wherein the maleamic-functional silicone having at least one maleamic acid group is

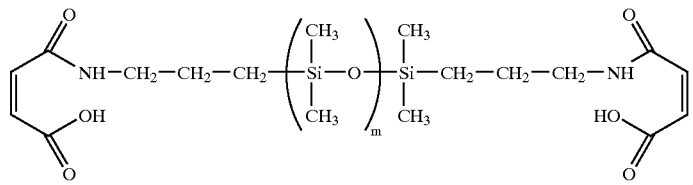

5. A release layer according to claim 2, wherein $R_2$ is terminated with —OCH=CH$_2$.

6. A release layer according to claim 1, wherein the electron donor molecule is hexanediol divinyl ether.

7. A release layer according to claim 4, wherein m is a number of 3 to 250.

8. A release layer according to claim 1, wherein the electron donor molecule forms a charge transfer complex with the maleamic-functional silicone having at least one maleamic acid group.

9. A release layer according to claim 1, further comprising a free radical polymerization catalyst.

10. A release layer according to claim 1, further comprising a free radical generating photoinitiator.

11. A release layer according to claim 1, wherein the substrate is paper.

12. A release layer comprising copolymers of
a) a maleamic-functional silicone having at least one terminal maleamic acid group, and
b) a vinyl ether, a 1-propenyl ether or both.

13. A release layer as in claim 1 wherein the copolymer is formed by U.V. initiated free radical polymerization.

14. A release layer as in claim 12 wherein the copolymer is formed by U.V. initiated free radical polymerization of a charge transfer complex formed from the terminal maleamic acid group and the vinyl ether, a 1-propenyl ether or both.

15. A release liner comprising a release layer of claim 1 and a substrate.

16. A release liner comprising a release layer of claim 12 and a substrate.

17. A coating formulation comprising
a) a maleamic-functional silicone having at least one maleamic acid group of the formula A

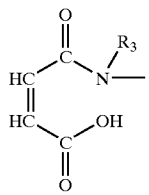

b) an electron donor molecule selected from the group consisting of vinyl ethers, propenyl ethers, styrene ethers and N-vinylpyrrolidone and
c) a free radical generating photoinitiator.

18. A coating formulation according to claim 17, wherein the electron donor molecule is an olefin monomer of formula (II)

$$R_{10}CH\!=\!CHA \qquad (II)$$

wherein
A is a nucleophilic moiety, selected from the group consisting of pyrrolidone, —OR$_2$, -phenyl-OR$_2$, or

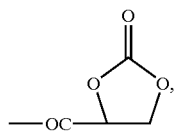

wherein R$_2$ is straight or branched C$_1$–C$_{20}$ alkyl, optionally terminated with OH or —OCH=CHR$_1$, and one or more non-adjacent —CH$_2$— groups are optionally replaced with O and/or cyclohexyl, and R$_{10}$ is H or methyl.

19. A coating formulation according to claim 17, wherein the maleamic-functional silicone having at least one maleamic acid group is

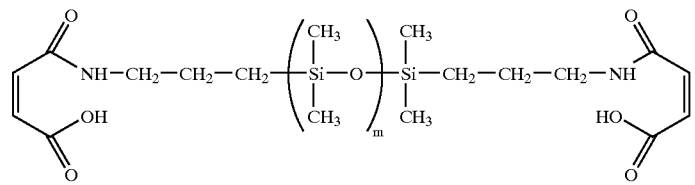

20. A coating formulation according to claim 17, wherein the electron donor molecule is hexanediol divinyl ether.

21. A coating formulation according to claim 17, wherein the electron donor molecule forms a charge transfer complex with the maleamic-functional silicone having at least one maleamic acid group.

22. A coating formulation comprising copolymers of
a) a maleamic-functional silicone having at least one terminal maleamic acid group,
b) a vinyl ether, a 1-propenyl ether or both and
c) a free radical generating photoinitiator.

* * * * *